Sept. 17, 1963 A. CLEARFIELD 3,104,248
ACETATOZIRCONYL HALIDES
Filed Dec. 30, 1960 2 Sheets-Sheet 1
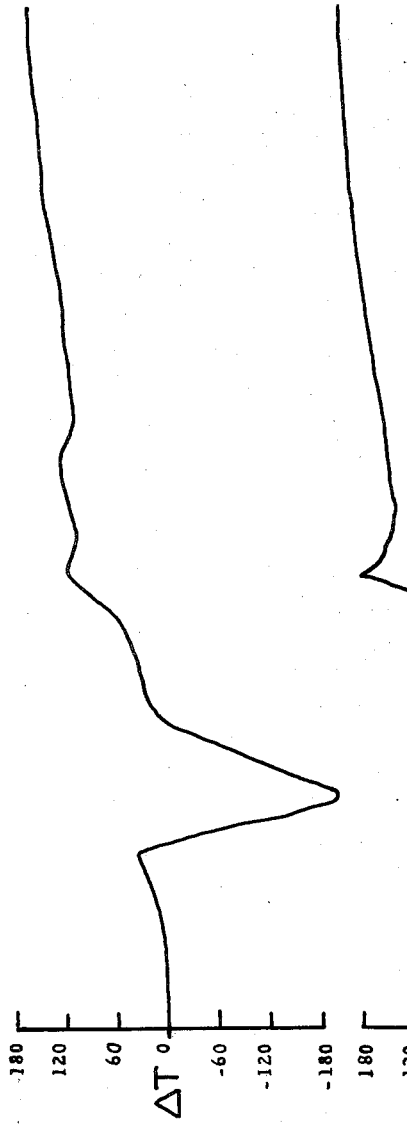
INVENTOR
ABRAHAM CLEARFIELD Sept. 17, 1963      A. CLEARFIELD      3,104,248
ACETATOZIRCONYL HALIDES
Filed Dec. 30, 1960      2 Sheets-Sheet 2
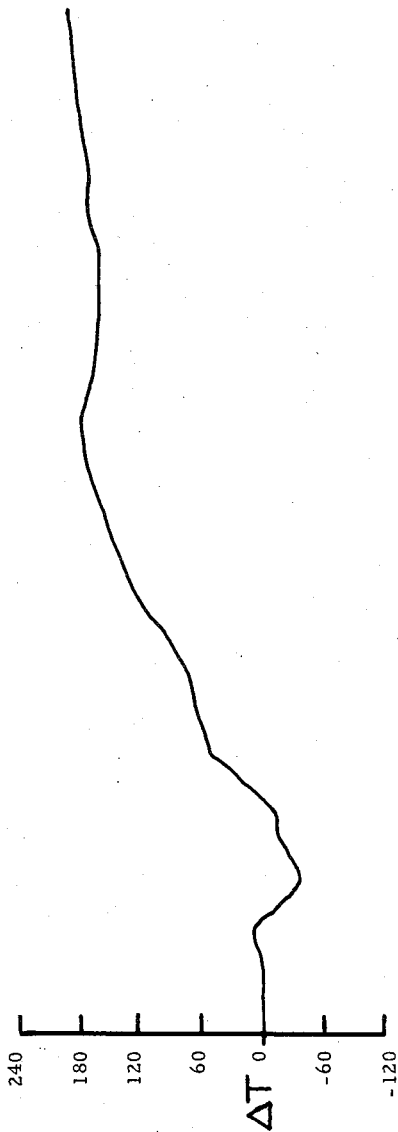
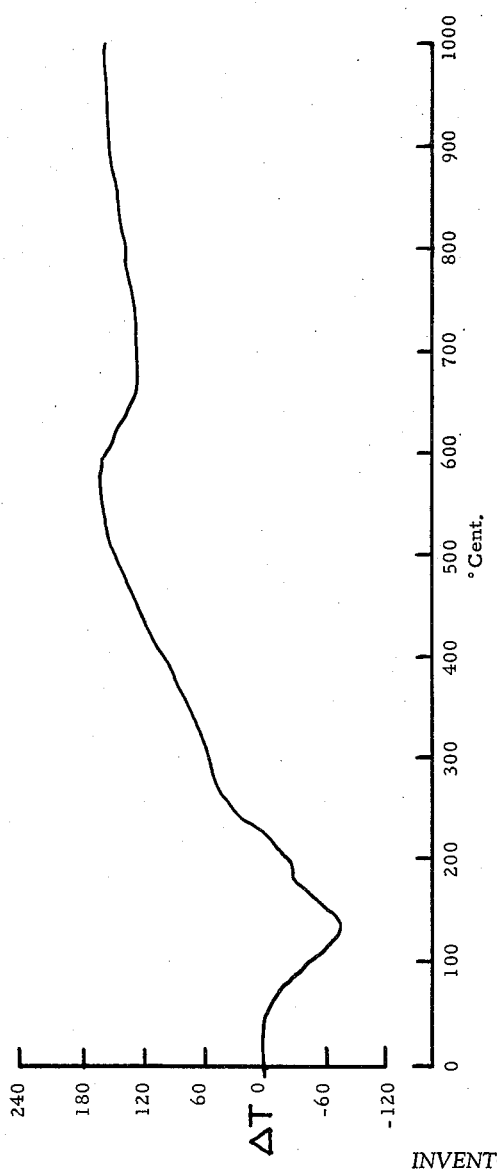
INVENTOR
ABRAHAM CLEARFIELD
BY
ATTORNEY

United States Patent Office 3,104,248
Patented Sept. 17, 1963

3,104,248
ACETATOZIRCONYL HALIDES
Abraham Clearfield, Niagara Falls, N.Y., assignor to National Lead Company, New York, N.Y., a corporation of New Jersey
Filed Dec. 30, 1960, Ser. No. 79,668
9 Claims. (Cl. 260—429.3)

The invention of this application relates to novel basic salts of zirconium which may be described as acetatozirconyl halides.

Zirconyl chloride in aqueous solution has a very low pH, a half molar solution, for example, having a pH of 0.6. For certain uses it is desirable to have zirconium salt solutions with ionizable chlorine that are less acid and a number of basic zirconium salts have been prepared in efforts to meet this need. It has now been discovered that zirconium complexes with acetate radicals form novel chlorides and bromides that readily dissolve in water and form solutions with relatively high pH values and that have unique and useful reactions.

While they vary somewhat as a result of differences in the reaction conditions under which they are formed, these novel halides have compositions such that their empirical formulas may be written $$Zr(OH)_{4-(a+b)}(CH_3COO)_a X_b \cdot H_2O$$

where X is a halogen of the group consisting of chlorine and bromine and where $a$ is a number in the range from 1.30 to 1.50 inclusive, and $b$ is a number in the range from 0.4 to 0.7, inclusive.

The novel compounds of the present invention may be produced in several ways. Typical procedures are given below as illustrations.

EXAMPLE 1

To a solution of 42 g. of zirconyl chloride in 100 ml. of water there is added 100 ml. of glacial acetic acid. The mixture becomes cloudy but quickly clears upon stirring. It is then heated to boiling, the boiling being continued for 5 minutes. A precipitate forms and the slurry is allowed to cool and is filtered at room temperature. After washing free of chloride ion with glacial acetic acid, the precipitate is dried at 50° C. and a fine, white, granular solid is obtained. An analysis of this solid shows Zr, 37.7%; Cl, 8.7%; CH$_3$COO$^-$, 30.9%; H$_2$O, 16.1%. The molar ratios of acetate to zirconium and chlorine to zirconium are, respectively, 1.3:1 and 0.6:1. This corresponds to the empirical formula $$Zr(OH)_{2.1}(CH_3COO)_{1.3}Cl_{0.6} \cdot H_2O$$

The zirconyl chloride solution used in the foregoing example may be obtained by dissolving ZrOCl$_2 \cdot$8H$_2$O in water or by the reaction of hydrochloric acid on any suitable zirconium compound such as a zirconium salt or hydrous zirconium carbonate.

A similar procedure starting with an aqueous solution of a more basic zirconium chloride is shown in:

EXAMPLE 2

To 25 ml. of a solution of a basic zirconyl chloride, Zr(OH)$_3$Cl, containing an equivalent of 2 g. of ZrO$_2$ there is added 50 ml. of glacial acetic acid. A slight precipitate forms which, however, disappears on stirring. The mixture is boiled for 5 minutes, a permanent precipitate being formed. After cooling the slurry to room temperature the precipitate is filtered off, washed with glacial acetic acid and dried at 50° C. Analysis of the finely granular white material shows Zr, 37.2%; Cl, 8.64%; CH$_3$COO$^-$, 33.4%; H$_2$O, 14.5%, making the acetate: Zr molar ratio 1.4:1 and the Cl:Zr molar ratio 0.6:1. This corresponds to the empirical formula $$Zr(OH)_{2.0}(CH_3COO)_{1.4}Cl_{0.6} \cdot H_2O$$

Similar results are obtained when using solid zirconyl chloride as shown in:

EXAMPLE 3

Fifty ml. of glacial acetic acid is added to 10 g. of solid zirconyl chloride, ZrOCl$_2 \cdot$8H$_2$O. The mixture is boiled for 5 minutes and after cooling is filtered. The recovered solid is washed with glacial acetic acid and dried at 50° C. giving a white powder with a Cl:Zr molar ratio of 0.55:1 and an acetate:Zr molar ratio of 1.45:1, the complete analysis being Zr, 37.1%; Cl, 7.84%; CH$_3$COO$^-$, 34.2%; H$_2$O, 14.4%. The corresponding empirical formula is Zr(OH)$_2$(CH$_3$COO)$_{1.45}$Cl$_{0.55} \cdot$H$_2$O.

Solid zirconium tetrachloride may also be reacted with acetic acid to produce a similar product as shown by:

EXAMPLE 4

To 100 ml. of glacial acetic acid there is added 46.8 g. of solid zirconium tetrachloride. The latter dissolves with evolution of heat. The solution is filtered while hot to remove insoluble impurities and is then diluted with 32.4 ml. of water and boiled for 5 minutes. A precipitate is formed. After cooling to room temperature the slurry is filtered and the precipitate is washed free of Cl$^-$ with glacial acetic acid. On drying at 50° C. a white powder analyzing Zr, 36.7%; Cl, 7.31%; CH$_3$COO$^-$, 32.1%; H$_2$O, 17.5% is obtained. The product which has chlorine and acetate molar ratios of 0.52 and 1.36, respectively, corresponds to the formula $$Zr(OH)_{2.12}(CH_3COO)_{1.36}Cl_{0.52} \cdot H_2O$$

EXAMPLE 5

14.5 milliliters of concentrated hydrochloric acid is added to 100 ml. of a zirconyl acetate solution containing 71.5 g. of ZrO(CH$_3$COO)$_2 \cdot$H$_2$O. After adding 100 ml. of glacial acetic acid the mixture is heated to boiling and boiled until the volume is reduced to half, a precipitate being formed. The slurry is then cooled to room temperature and the precipitate, after washing with glacial acetic acid, is filtered off and dried at 50° C. A white, powdery product is obtained which has an analysis of Zr, 36.4%; Cl, 7.89%; CH$_3$COO$^-$, 32.0%; H$_2$O, 14.6%; the acetate and chlorine molar ratios being 1.37; 1 and 0.56:1, respectively. This corresponds to the empirical formula Zr(OH)$_{2.07}$(CH$_3$COO)$_{1.37}$Cl$_{0.56} \cdot$H$_2$O.

In connection with Example 1, it was pointed out that zirconyl chloride may be produced by action of HCl on suitable zirconium salts. This is illustrated in Example 5 where the zirconyl acetate and HCl react to form a zirconyl chloride solution.

Although in the foregoing examples the reaction mass has been heated to boiling temperature for convenience and to increase the speed of the reaction, lower reaction temperatures may be used. With longer heating periods temperatures as low as 70° C.–75° C. are satisfactory. For example, it was found that if the reaction of Example 1 is carried out at 72° C.–75° C. for only 15 minutes a product yield of approximately 70% is obtained. Longer heating or higher temperatures will, of course, increase the yield. In general, it is preferred to use a temperature of at least about 90° C. since the heating time can thereby be minimized while good yields are obtained.

Acetatozirconyl bromides may also be produced by procedures likes those described in the preceding examples. The following example illustrates such production.

EXAMPLE 6

To a solution of 41.2 g. of zirconium tetrabromide in 100 ml. of water, which solution has been filtered to remove insoluble impurities, there is added 100 ml. of acetic acid. A temporary precipitate is formed which redissolves on stirring. The mixture is then heated to boiling and boiled for 30 minutes during which time a white, granular, permanent precipitate is formed. After cooling, the precipitate is filtered off, washed free of Br⁻ with glacial acetic acid and dried at 50° C. The product is a fine, white, granular solid which analyzes: Zr, 33.3%; Br, 18.9%; $CH_3COO^-$, 29.0%; $H_2O$, 13.0%, the molar ratios of acetate and bromine to zirconium being respectively, 1.35 and 0.65. This corresponds to the empirical formula $Zr(OH)_2(CH_3COO)_{1.35}Br_{0.65} \cdot H_2O$.

In the following table there are set forth the molar ratios of halogen and acetate to zirconium in a number of acetatozirconyl halides produced in accordance with the present invention.

*Table A*

[Molar ratios with respect to Zr]

| Halogen | Acetate |
|---|---|
| 0.44 | 1.30 |
| 0.52 | 1.34 |
| 0.55 | 1.35 |
| 0.56 | 1.26 |
| 0.60 | 1.37 |
| 0.65 | 1.40 |
| 0.69 | 1.45 |

It is evident from the foregoing that the novel products of the invention have some variations in their compositions, but that their compositions are such as to correspond to the general empirical formula

$$Zr(OH)_{4-(a+b)}(CH_3COO)_a X_b \cdot H_2O$$

in which X is a halogen selected from the group consisting of chlorine and bromine, $a$ is a number in the range from 1.30 to 1.50, inclusive, and $b$ is a number in the range from 0.4 to 0.7, inclusive. Although the basic reason for the slight variations in composition of the present novel products is not definitely known, it is believed that under different reaction conditions there is some minor variation, such as a difference in degree of polymerization, in the zirconylacetate complex which forms the cation of the compounds.

Not withstanding the slight variations in composition referred to above, the novel compounds herein described are very similar. Their reactions show that the halide in the compounds is completely ionizable and may be removed by addition of silver nitrate to solutions of the compounds. On the other hand, the acetate groups are more firmly bound. In addition, the compounds are alike in having high water solubility, relatively high pH values in solution, and low solubilities in alcohols, in being insoluble in glacial acetic acid, and in their ability to precipitate novel pigments from solutions of acid dyes. It has also been found that the compounds show very similar effects when subject to differential thermal analysis. Tests on three acetatozirconyl chloride samples prepared in three different ways were made, using standard differential thermal analysis apparatus, in the following manner:

In each test finely ground alumina was used as a comparison standard. The samples of acetatozirconyl chloride were separately ground to fine powder with a mortar and pestle. For each test one of the powdered samples was enclosed in a platinum foil sample holder and the holder was placed around one of the two terminals of the differential thermocouple. A similar sample holder containing powdered alumina was placed around the other thermocouple terminal. The thermocouple assembly was then placed in a controlled, resistance wire heated furnace and the temperature was raised at a constant rate of 12° C. per minute to 1000° C. Since phase changes, such as loss of water of hydration, crystal transformations, etc. are always accompanied by either absorption or evolution of heat, the temperature of a test sample varies drastically during such changes. The alumina, however, does not undergo any phase change between room temperature and 1000° C. and completely follows the temperature of the furnace. The differences in temperatures of the sample and the alumina as detected by the thermocouple terminals cause potential differences between the terminals which are measured by a potentiometer and may be recorded on a chart as a curve in which the phase changes are represented as maxima and minima.

In the accompanying drawings FIGURE 1 shows a condensed differential thermal analysis curve for a sample of acetatozirconyl chloride prepared substantially in accordance with the procedure of Example 1, FIGURE 2 shows a condensed differential thermal analysis curve for a sample prepared substantially in accordance with the procedure of Example 3, and FIGURE 3 shows a condensed curve representing differential thermal analysis data for a sample prepared substantially in accordance with Example 4. As will be seen, except for the magnitudes of the heat effect, the curves in these three figures are quite similar with a characteristic minimum in each case at 225°.

In FIG. 4 there is shown a condensed curve representing a differential thermal analysis test, by the same procedure described above, using as a test specimen a portion of a mechanical mixture of powdered zirconyl chloride and zirconyl acetate in such proportions as to be equivalent in composition with respect to $ZrO_2$, Cl, and $CH_3$, $COO^-$ with acetatozirconyl chloride.

FIGURE 5 shows a condensed differential thermal analysis curve for the product obtained by dissolving in water a portion of the mixture of zirconyl chloride and zirconyl acetate described in the immediately preceding paragraph, boiling the solution and then evaporating it to dryness. The differential thermal analysis was carried out in the manner described above.

Obviously, the similar patterns shown in FIGURES 4 and 5, are so different from the curves of FIGURES 1–3, inclusive, as to leave no doubt that the materials tested for FIGURES 4 and 5 are different from the products of Examples 1, 3 and 4 and the acetatozirconyl halides of the present invention are distinct, new compounds.

The novel acetatozirconyl halides of the present invention contain only very small amounts of metallic impurities. Zirconium dioxide obtained by calcining acetatozirconyl chloride at 800° C. in an oxidizing atmosphere was found to contain a total of less than 0.1% of other metallic oxides, disregarding hafnium oxide. A convenient source for very pure zirconium oxide is, therefore, now available. Further, as mentioned above, the pH of aqueous solutions of acetatozirconyl chlorides and bromides is relatively high and certain of the compounds may, therefore, be used in the cosmetic and pharmaceutical fields where the lower pH values of other zirconium salt solutions make them unsuitable.

As previously mentioned, acetatozirconyl halides form pigments or toners by reaction with and precipitation of acid dyes. This is illustrated by:

EXAMPLE 7

Twelve grams of Orange II dye is dissolved in 400 ml. of water and heated to 95° C., the pH being adjusted to 2.5 with HCl. A solution of 19.1 g. of acetatozirconyl chloride in 250 ml. of water is also prepared and heated to 50° C. The second solution is then added to the first solution with stirring over a 15 minute period while maintaining the temperature at 95° C. and adding NaOH solution as needed to maintain a pH of 2.8. Stirring is continued for 5 minutes after the acetatozirconyl chloride addition is completed and the slurry is then cooled to 50° C. and filtered to remove the precipitated toner. This is washed with dilute HCl (pH 2.5) and dried at 55° C. The pigment product has a bright orange color and analysis shows a molar Zr:dye ratio of 2.5 and an acetate content of 30.8%.

Very similar toners or pigments are obtained with other samples of acetatozirconyl chloride by following the same procedure. As with all dye precipitations somewhat different results may be obtained by varying the reaction conditions and it will be understood that variations in the stated reaction conditions as well as any conventional procedure may be employed. Other acid dyes such, for example, as erioglaucine and Fast Light Yellow 3G can also be precipitated with acetatozirconyl chloride solutions by conventional or other methods to obtain pigments or toners of useful bright hues. If desired, acetatozirconyl bromide can be used in the preparation of pigments from acid dyes. However, the preparation with acetatozirconyl chloride is less expensive and more convenient.

Novel toners of the type described in Example 7 may be used advantageously in printing inks where their bright, clean colors will produce good contrasts. An example of such an ink is:

EXAMPLE 8

A mixture of 40 g. of the novel orange toner of Example 7 and 20 g. of blanc fixe are placed in a ball mill with 25 g. of ethyl cellulose, 15 g. oil-soluble phenol-formaldehyde resin, 6 g. dibutyl phthalate, 0.25 g. octyl phenol, 50 ml. butanol, and 50 ml. ethylene glycol monoethyl ether. The mixture is ground in the ball mill until the pigment is thoroughly dispersed and the dispersion may then be thinned as desired with additional solvent. The resultant ink is well adapted for use with conventional ink handling equipment and on presses designed for use with heat-setting inks.

The novel acetatozirconyl halides of the present invention are not mere mixtures of zirconyl chloride or bromide with zirconyl acetate. This is shown by the following:

(1) The difference in differential thermal analysis curves between acetatozirconyl chlorides and (a) a mechanical mixture of zirconyl chloride and zirconyl acetate and (b) the product obtained by dissolving such a mechanical mixture in water, boiling and evaporating the solution to dryness.

(2) The failure of any precipitate to form when zirconyl chloride and zirconyl acetate are dissolved in water and boiled.

(3) The formation of acetatozirconyl chloride in an amount equivalent only to the zirconyl chloride content of a water solution of a mixture of zirconyl acetate and zirconyl chloride when glacial acetic acid is added thereto and the solution is boiled.

(4) The fact that when an excess of acetatozirconyl chloride is placed in a quantity of water and agitated until the water is saturated the dissolved portion and the residual undissolved portion when analyzed were found to have Cl:Zr ratios, respectively, of 0.649:1 and 0.665:1, the original halide having a Cl:Zr ratio of 0.656:1. The correspondence of ratios indicates that acetatozirconyl halides dissolve as single phases.

(5) Their behavior with dyes: although the toner obtained by following Example 7 contains acetate radicals, zirconyl acetate alone does not precipitate acid dyes in aqueous solution. Such dyes are precipitated by zirconyl chloride but the toners thus obtained are different from those obtained with acetatozirconyl chlorides. This is illustrated in the following example.

EXAMPLE 9

Employing the same procedure as set forth in Example 7 except that 24.8 g., an excess, of zirconyl chloride is used instead of 19.1 g. of acetatozirconyl chloride, a toner is prepared with 12 g. Orange II dye. This toner is darker than the product of Example 7 and has different texture. On analysis, it is found to have a molar Zr:dye ratio of only 2.13 and, of course, no acetate groups. Thus, the toners obtained with zirconyl chloride alone are seen to be quite different in composition and appearance from the novel ones obtained with acetatozirconyl chlorides.

The novel acetatozirconyl halides of the present invention are, as pointed out above, fine, white, granular materials. They are amorphous, no X-ray diffraction patterns being found. They have closely similar properties, being readily soluble in water to a considerable extent with the production of solutions of relatively high pH values, having limited solubility in alcohols, and being substantially insoluble in concentrated acetic acid.

The last mentioned characteristic, as will be evident, is of particular importance in the preparation of the novel halides and their recovery. Referring, for instance, to Example 1, it will be seen that the acetatozirconyl chloride product is apparently formed during heating. Whether it is formed directly or as the result of hydrolysis or other reaction of the intermediate and unidentified compound that is produced as a fugitive precipitate that immediately redissolves during addition of the acetic acid is not known. However, the acetatozirconyl chloride being insoluble in concentrated acetic acid is precipitated upon formation if the acetic acid concentration in the ambient aqueous solution is great enough. The solubility of the halides is limited in solutions containing about 25% by volume of acetic acid but better yields are obtained with solutions of higher acetic acid content. In a series of tests it was found that under otherwise identical conditions the yield of acetatozirconyl halide product was increased from 53% to 97% of the theoretical by increasing the acetic acid concentration of the solution from 28% to 50% by volume.

In the foregoing description of the invention and the appended claims percentages are by weight unless otherwise indicated.

I claim:

1. An acetatozirconyl halide having a composition corresponding to the empirical formula $$Zr(OH)_{4-(a+b)}(CH_3COO)_a X_b \cdot H_2O$$

in which X is a halogen selected from the group consisting of chlorine and bromine, $a$ is a number in the range from 1.30 to 1.50, inclusive, and $b$ is a number in the range from 0.4 to 0.7, inclusive, said halide being a non-crystalline, white, granular solid, soluble in water to produce solutions with relatively high pH values and substantially insoluble in concentrated acetic acid.

2. An acetatozirconyl halide as set forth in claim 1 in which the halogen is chlorine.

3. An acetatozirconyl halide as set forth in claim 1 in which the halogen is bromine.

4. A process for producing an acetatozirconyl halide which comprises reacting, in the presence of water and at a temperature from about 70° C. to the boiling point of the reaction mass, zirconyl ions, $CH_3COO^-$ ions, and ions of the group consisting of $Cl^-$ and $Br^-$.

5. A process as set forth in claim 4 in which $Cl^-$ ions are used.

6. A process as set forth in claim 4 in which $Br^-$ ions are used.

7. A process as set forth in claim 4 in which the reaction mass is boiled.

8. A process as set forth in claim 4 in which there is in the solution of the reaction mass an acetic acid concentration of at least 25% by volume.

9. A process as set forth in claim 4 in which there is in the solution of the reaction mass an acetic acid concentration of at least 50% by volume.

(References on following page)

References Cited in the file of this patent

UNITED STATES PATENTS

| | | |
|---|---|---|
| 2,335,537 | Reynolds | Nov. 30, 1943 |
| 2,396,328 | Kvalnes et al. | Mar. 12, 1946 |
| 2,424,262 | Wainer | July 22, 1947 |
| 2,597,721 | Goebel | May 20, 1952 |
| 2,736,735 | Michel et al. | Feb. 28, 1956 |
| 2,824,114 | Bostwick | Feb. 18, 1958 |
| 2,922,802 | Kaufman | Jan. 26, 1960 |

FOREIGN PATENTS

| | | |
|---|---|---|
| 800,160 | Great Britain | Aug. 20, 1958 |